United States Patent Office 3,438,943
Patented Apr. 15, 1969

3,438,943
POLYESTERS FROM OXAZOLINE POLYOLS
Thomas J. Miranda, Granger, and Herbert R. Herman, South Bend, Ind., assignors to The O'Brien Corporation, South Bend, Ind., a corporation of Indiana
No Drawing. Original application Mar. 6, 1963, Ser. No. 263,114. Divided and this application Aug. 17, 1966, Ser. No. 584,939
Int. Cl. C08g 17/06, 17/08, 17/10
U.S. Cl. 260—75                                9 Claims

ABSTRACT OF THE DISCLOSURE

A polymerization product obtained by the condensation reaction of a polycarboxylic acid having no more than four carboxylic groups and a molecular weight not over 350 with a heterocyclic compound having the formula

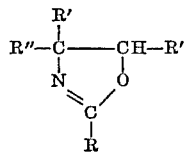

wherein R' is hydrogen or R"; R" is a hydrocarbon radical having only hydroxy groups as derivative groups and having at least two hydroxy groups therein attached to aliphatic carbon atoms and having no more than four said hydroxy groups; and R is a hydrocarbon radical and derivatives thereof in which the derivative groups are selected from specific groups named hereinafter.

This is a division of application Sr. No. 263,114, filed Mar. 6, 1963 and now abandoned.

This invention relates to heterocyclic alcohols and to polymers derived therefrom. More specifically, it relates to water-soluble polymers derived from such heterocyclic alcohols, which polymers are particularly suitable for use in water-thinned paints.

Water-thinned paints have many advantages over solvent-thinned paints such as freedom from solvent odor, ease of cleaning brushes or rollers, safety from fire involved in the use of combustible solvents, ease of application and rapid drying. Presently available water-thinned paints involve the use of emulsions prepared from polyvinyl acetate, polyacrylics, styrene-butadiene copolymers, etc. However, the water-thinned paint made from such emulsions have many disadvantages such as poor freeze-thaw stability, poor mechanical stability, poor pigment wetting and poor adhesion to chalky surfaces.

Moreover, attempts to produce high or semi-gloss paints from compositions seriously affect the brushability, the can stability, the flow characteristics and other properties of the resultant paint. Consequently, latex paints are generally limited to flat finishes. Hence, in cases where the latex paint is used for wall surfaces, it is necessary to use a conventional oil-base paint where it is desired to use a semi-gloss or high gloss finish for the trim on the woodwork.

Attempts to prepare water-thinnable paints from water-soluble Diels-Alder adducts of linseed oil or bodied linseed oil produce paints which are not satisfactory for interior white and pastel finishes because of the inherent yellowing. Attempts to correct this yellowing by the addition of zinc oxide results in premature gellation of the resultant paint.

Other attempts to prepare water-thinned paints by the use of addition polymers having carboxylic acid groups extending from the polymer chain and having such carboxylic groups neutralized with ammonia or other base results in products which give water-sensitive films and are unstable upon the addition of zinc oxide.

Water-thinned paints prepared from alkyd resins comprising polyhydric alcohols and aromatic polyacids, such as trimellitic anhydride, reacted to an acid number between 30 and 60, with the remainder of the carboxylic acid groups then being neutralized with ammonia or other base, also are not satisfactory in the white and pastel shades because of yellowing when neutralized with ammonia, etc., and are also unstable to zinc oxide.

In accordance with the present invention, new heterocyclic alcohols have been found which are capable of forming alkyd resins with polybasic acids to give water-soluble products having excellent characteristics which overcome the above-mentioned disadvantages of the presently available water-thinned paints.

The heterocyclic alcohols of this invention have the formula:

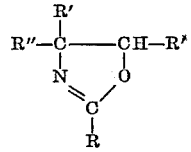

wherein R' represents hydrogen or a radical as defined for R"; R" is an aliphatic, cycloaliphatic or aromatic hydrocarbon radical, including combinations thereof, each having no more than 10 carbon atoms, and derivatives of said hydrocarbon radicals having only hydroxy radicals as the derivative groups; and at least one of said R' or R" radicals in said formula having at least one hydroxy group attached to an aliphatic carbon atom therein, the total of said hydroxy groups in said R" and R' groups preferably being no more than 4; and R is an aliphatic, cycloaliphatic or aromatic hydrocarbon radical or a derivative thereof in which each derivative group is selected from the class consisting of hydroxy, acyloxy, chloro, fluoro, cyano, —OR", carboxylic acid and carboxylate derivative groups, said hydrocarbon and said hydrocarbon derivative radicals each having no more than 24 carbon atoms therein.

Typical examples of the R' and R" groups are the following: methyl, ethyl, propyl, allyl, vinyl, hydroxymethyl, hydroxyethyl, hydroxypropyl, dihydroxybutyl, dihydroxyoctyl, phenyl, phenethyl, hydroxyphenyl, naphthyl, tolyl, xylyl, hydroxymethyl-phenyl, hydroxymethyl-naphthyl, dimethylolphenyl, diethylolphenyl, cyclohexyl, methylcyclohexyl, ethylcyclohexyl, hydroxycyclohexyl, hydroxymethyl-cyclohexyl, dimethylolcyclohexyl, cyclopentyl, trihydroxynonyl, tetrohydroxydecyl, etc.

Typical R groups include those listed above for R' and R" and preferably also include radicals derived from drying and semi-drying acids such as are present in the various drying and semi-drying oils including oleic, linoleyl, linolenyl, ricinoleyl, as well as various other unsaturated, as well as saturated fatty acid radicals, such as palmyl, stearyl, margaryl, etc. In addition to those indicated above, other typical R radicals include chloromethyl, fluoromethyl, cyano-methyl, trifluoromethyl, difluoromethyl, chloro-difluoromethyl, chloro-cyclohexyl, chlorophenyl, chloro-naphthyl, acetoxy-phenyl, trifluoromethyl-phenyl, chloroamyl, fluorononyl, cyano-decyl, cyanocyclohexyl, cyanotolyl, cyanomethyl-naphthyl, butyroxyethyl, acetyl-ricinoleyl, etc.

Preferred compounds of this invention are those in which the combination of R' and R" radicals have at least 2 hydroxy groups, and also have a drying or semi-drying radical as the R group. Such compounds have at least one but preferably at least two ethylenically unsaturated groups in the R radical. However, compounds in which the R radical is saturated such as in many of the radicals illustrated above or in fatty radicals such as stearyl, palmyl, margaryl, etc., can be used for various purposes including modifiers, lubricants and plasticizers in paint or resin compositions.

The compounds of this invention are prepared by reacting an acid of the formula R—COOH, as such or in a derivative form, e.g., the anhydride or acid halide form, with an amine of the formula

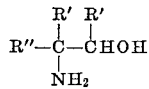

in which the R, R' and R" are as defined above.

Typical amines that can be used in preparing the compounds of this invention include:

1-amino-tri(hydroxymethyl)-methane;
2-amino-2-ethyl-1,3-propanediol;

Typical acids that can be used in preparing the compounds of this invention, including the corresponding anhydrides and acid halides, are: oleic, linoleic, linolenic, ricinoleic, palmitic, stearic, margaric, benzoic, toluic, phenylacetic, cyclohexylacetic, (vinylphenyl)aeti, cyclohexenylaetic, maleic, mono-ethyl ester of maleic, monoethyl ester of itaconic, chlorobenzoic, fluorobenzoic, (trifluoromethyl)benzoic, ethoxybenzoic, acetoxybenzoic, monobutyl ester of phthalic, 7-acetoxy-octoic, acetylricinoleic, butyrl-ricinoleic, phenoxyacetic, methoxybenzoic, butoxynaphthoic, cyclohexyloxyacetic, chlorohexylaetic, methylolbenzoic, hydroxycyclohexylacetic, monoglyceride ester of succinic, 2,2-dimethylolpropionic acids, etc.

The compounds of this invention are illustrated by the following typical compounds in which the following groups are substituted for the groups of the general formula:

| R | R" | R' (attached to same carbon as is attached to N) | R' (attached to same carbon as is attached to O) |
|---|---|---|---|
| Linoleyl [1] | —CH$_2$OH | —CH$_2$OH | H |
| Ricinoleyl | —CH$_2$OH | —CH$_2$OH | H |
| Oleyl | —CH$_2$OH | —CH$_2$OH | H |
| Linolenyl | —CH$_2$OH | —CH$_2$OH | H |
| Stearyl | —CH$_2$OH | —CH$_2$OH | H |
| Palmyl | —CH$_2$OH | —CH$_2$OH | H |
| Vinylphenyl | —CH$_2$OH | —CH$_2$OH | H |
| Vinylcyclohexyl | —CH$_2$OH | —CH$_2$OH | H |
| 1,1-dimethylolethyl | —CH$_2$OH | —CH$_2$OH | H |
| Benzyl | —C$_2$H$_5$OH | —CH$_2$OH | H |
| Cyclohexylmethyl | —C$_5$H$_{11}$OH | —C$_2$H$_5$OH | —C$_2$H$_4$OH |
| Vinylphenylmethyl | —CH$_2$OH | H | —CH$_2$OH |
| Cyclohexenylmethyl | —CH$_2$OH | H | —CH$_2$OH |
| Maleic | —C$_6$H$_4$CH$_2$OH | H | —CH$_2$OH |
| Monomethyl maleate | —C$_6$H$_{10}$OH | —CH$_2$OH | H |
| Chlorophenyl | —C$_3$H$_7$ | —CH$_2$OH | —C$_2$H$_4$OH |
| Trifluoromethylphenyl | —C$_{10}$H$_7$ | —C$_2$H$_4$OH | —C$_2$H$_4$OH |
| Etoxyphenyl | —CH$_2$OH | H | —C$_6$H$_4$CH$_2$OH |
| Acetoxyphenyl | —CH$_2$CH(OH)CH$_3$ | —CH$_2$OH | H |
| Butyroxyoctyl | —(CH$_2$)$_2$CH(OH)CH$_3$ | —CH$_2$OH | —CH$_2$OH |
| Acetylricinoleyl | —C$_8$H$_{17}$ | —C$_2$H$_4$OH | —CH$_3$ |
| Phenoxymethyl | —CH$_2$OH | H | —CH$_2$OH |
| Methylolphenyl | —CH$_2$OH | —C$_3$H$_6$OH | —C$_6$H$_{11}$ |
| Monoglyceride ester of succinic | —CH$_2$OH | H | —C$_6$H$_{10}$OH |
| Linoleyl | —C$_6$H$_3$(CH$_2$OH)$_2$ | —CH$_2$OH | —CH$_2$OH |
| Ricinoleyl | —CH$_2$OH | H | —C$_6$H$_3$(CH$_2$OH)$_2$ |
| Oleyl | —CH$_2$CH(OH)CH$_3$ | H | —CH$_2$CH(OH)CH$_3$ |
| Linolenyl | —C$_6$H$_{10}$CH$_2$OH | —CH$_2$OH | H |
| Linoleyl | —CH$_2$CH(OH)CH$_3$ | —C$_2$H$_5$ | —C$_6$H$_{10}$CH$_2$OH |
| Ricinoleyl | —C$_6$H$_5$ | —CH$_3$ | —CH$_2$CH(OH)CH$_3$ |
| Oleyl | —C$_6$H$_{11}$ | —CH$_3$ | —CH(OH)CH$_3$ |
| Linolenyl | —CH$_{10}$H$_7$ | —CH$_3$ | —CH(OH)CH$_3$ |
| Ricinoleyl | —C$_6$H$_4$CH$_2$OH | —CH$_3$ | —CH(OH)CH$_3$ |

[1] Where reference is made to an acid such as linoleyl the R group represented is the radical found in that acid by omitting the COOH group.

2-amino-2-propyl-1,3-propanediol;
2-amino-2-butyl-1,3-propanediol;
2-amino-2-amyl-1,3-propanediol;
2-amino-2-decyl-1,3-propanediol;
2-amino-2-octadecyl-1,3-propanediol;
2-amino-2-phenyl-1,3-propanediol;
2-amino-2-tolyl-1,3-propanediol;
2-amino-2-(methylolphenyl)-1,3-propanediol;
2-amino-2-naphthyl-1,3-propanediol;
2-amino-2-xylyl-1,3-propanediol;
2-amino-2-cyclohexyl-1,3-propanediol;
2-amino-2-(hydroxycyclohexyl)-1,3-propanediol;
2-amino-2-methyl-1,4-butanediol;
2-amino-2-ethyl-1,4-butanediol;
2-amino-2-propyl-1,4-butanediol;
2-amino-2-amyl-1,4-butanediol;
2-amino-2-octadecyl-1,4-butanediol;
2-amino-2-(dimethylolphenyl)-1,4-butanediol;
2-amino-2-(dimethylolcyclohexyl)-1,4-butanediol;
2-amino-2,2-bis-(methylolphenyl)-ethanol;
2-amino-2-(ethylolnaphthyl)-ethanol-1;
2-amino-2,2-bis-(methylolcyclohexyl)-ethanol;
2-amino-2-(ethylolcyclohexyl)-ethanol-1;
2-amino-2,2-bis(8-hydroxyoctyl)-ethanol;
3-amino-2,7-dihydroxyoctane;
3-amino-1,4,6-trihydroxy-hexane;
2-amino-2-methyl-1,3,5-hydroxypentane;
2-amino-1,2-bis-(methylolphenyl)-ethanol;
2-amino-1,2-dicyclohexylolethanol, etc.

As stated above, the heterocyclic compounds of this invention can be prepared by the reaction of one or more of the above-defined amino alcohols with an acid, acid anhydride or acid halide having the desired R radical to give the ultimate desired compound. The components are reacted under conditions which effect the separation of the water formed as the acid is first converted to an amide and then cyclization completed.

Preparation of these compounds is best illustrated by the following examples which are intended merely for illustration, and it is not intended that the scope of the invention nor the manner in which it can be practiced is to be limited in any way by these examples. Unless specifically indicated otherwise in these examples and throughout the specification parts and percentages are by weight.

EXAMPLE I

To a one-liter flask equipped with stirrer, an inlet for maintaining a nitrogen atmosphere, thermometer and a reflux condenser equipped with a trap for separating condensate water, are added 130 grams of 1,1,1-trimethylol-1-aminomethane, 280 grams of linoleic acid and 100 grams of xylene. The stirrer is started, the flask heated and the temperature maintained at reflux temperature until 36 cc. of water has been removed. This takes approximately 6 hours and a final temperature of about 225° C. is attained. The acid number of this product is 0.8. The hot product is poured under a nitrogen atmosphere to a pan lined with aluminum foil. Upon cooling, a soft, white, waxy solid is obtained in quantitative yield. Analyses for carbon hydrogen, nitrogen and oxygen check closely for the theoretical values of the compound having the formula:

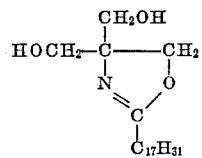

This compound is 2-heptadecadienyl-4,4-bis(hydroxymethyl)-oxazoline. The product made by using soya fatty acid is essentially this compound.

EXAMPLE II

The procedure of Example I is repeated using in place of the amino compound of that example an equivalent weight of 2-amino-2-methyl-1,3-propanediol. An excellent yield is obtained of a product having an acid number of 0.6. This product is 2-heptadecadienyl-4-methyl-4-(hydroxymethyl)-oxazoline which has the formula:

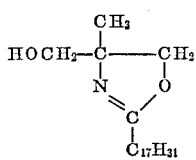

EXAMPLE III

The procedures of Examples I and II are repeated a number of times using respectively in place of the linoleic acid of those examples the following individual acids: eleic, linolenic, ricinoleic, stearic, palmitic, benzoic, octanoic, phenylacetic, cyclohexylacetic, acetoxyphenylacetic, chlorobenzoic, and trifluoromethylcyclohexylacetic acids. Accordingly, the following respective products are obtained:

2-heptadecenyl-4,4-bis(hydroxymethyl)-oxazoline;
2-heptadecatrienyl-4,4-bis(hydroxymethyl)-oxazoline;
2-hydroxyheptadecenyl - 4,4 - bis(hydroxymethyl)-oxazoline;
2-heptadecyl-4,4-bis(hyroxymethyl)-oxazoline;
2-pentadecyl-4,4-bis(hydroxymethyl)-oxazoline;
2-phenyl-4,4-bis(hydroxymethyl)-oxazoline;
2-heptyl-4,4-(bis(hydroxymethyl)-oxazoline;
2-benzyl-4,4-bis(hydroxymethyl)-oxazoline;
2-(cyclohexylmethyl)-4,4-bis(hydroxymethyl)-oxazoline;
2-(acetoxybenzyl)-4,4-bis(hydroxymethyl)-oxazoline;
2-(chlorophenyl)-4-4-bis(hydroxymethyl)-oxazoline;
2 - (trifluoromethyl - cyclohexylmethyl)-4,4-bis(hydroxymethyl)-oxazoline;
2-heptadecenyl-4-methyl-4-(hydroxymethyl)-oxazoline;
2 - heptadecatrienyl - 4 - methyl - 4 - (hydroxymethyl)-oxazoline;
2 - hydroxyheptadecenyl - 4 - methyl - 4 - (hydroxymethyl)-oxazoline;
2-heptadecyl-4-methyl-4-(hydroxymethyl)-ozazoline;
2-pentadecyl-4-methyl-4-(hydroxymethyl)-oxazoline;
2-phenyl-4-methyl-4-(hydroxymethyl)-oxazoline;
2-heptyl-4-methyl-4-(hydroxymethyl)-oxazoline;
2-benzyl-4-methyl-4-(hydroxymethyl)-oxazoline;
2 - (cyclohexylmethyl) - 4 - methyl - 4 - (hydroxymethyl)-oxazoline;
2 - (acetoxybenzyl) - 4 - methyl - 4 - (hydroxymethyl)-oxazoline;
2-(chlorophenyl)-4-methyl-4-(hydroxymethyl)-oxazoline;
2 - (trifluoromethyl - cyclohexylmethyl) - 4 - methyl - 4- (hydroxymethyl)-oxazoline;

EXAMPLE IV

The procedure of Example I is repeated a number of times using individually in place of the amino alcohol of that example an equivalent weight in each case of the following amino compounds respectively:

2-amino-2-methyl-1,4-butanediol;
2-amino-2-ethyl-1,3-propanediol;
2-amino-2-propyl-1,3-propanediol;
2-amino-2-(7-hydroxy-octyl)-1,3-propanediol;
3-amino-3-propyl-2,5-hexanediol;
2-amino-2-phenyl-1,3-propanediol;
5-amino-5-naphthyl-4,7-octanediol;
2-amino-2-(ethylol-phenyl)-1,3-propanediol;
2-amino-2-(methylol-cyclohexyl)-1,3-propanediol;
2-amino-2-methylol-1,4-butanediol;
1-phenyl-3-amino-2,5-hexanediol;
1-cyclohexylol-3-amino-2,5-hexanediol.

Accordingly the products obtained from the above reactions are respectively:

2-heptadecadienyl-4-methyl-4-ethylol-oxazoline;
2-heptadecadienyl-4-ethyl-4-methylol-oxazoline;
2-heptadecadienyl-4-propyl-4-methylol-oxazoline;
2 - heptadecadienyl - 4 - methylol - 4 - (7 - hydroxyoctyl)-oxazoline;
2 - heptadecadienyl - 4 - propyl - 4(2 - hydroxypropyl)-5-methyl-oxazoline;
2-heptadecadienyl-4-phenyl-4-methylol-oxazoline;
2 - heptadecadienyl - 4 - naphthyl - 4 - (2 - hydroxypropyl)-5-propyl-oxazoline;
2 - heptadecadienyl - 4 - methylol - 4 - (ethylolphenyl)-oxazoline;
2 - heptadecadienyl - 4 - methylol - 4 - (ethylolcyclohexyl)-oxazoline;
2 - heptadecadienyl - 4 - methylol - 4 - ethylol - oxazoline;
2 - heptadecadienyl - 4 - (2 - hydroxypropyl) - 5 - benzyl-oxazoline.

As previously indicated, the heterocyclic alcohols of this invention can be used in the preparation of water-soluble polymers by their reaction with various polyfunctional acids. When the heterocyclic alcohol has two or more hydroxy groups in the compound, dibasic acids can be used satisfactorily. In some cases it is desirable to use mixtures of the heterocyclic alcohols of this invention in which some of the compounds have one free hydroxy group and others have two or more. Likewise, mixtures of polybasic acids having two or more acid groups per molecule can be used.

Typical polybasic acids that can be used for this purpose include: trimellitic, trimesic, hemimellitic, pyromellitic, tricarballylic, $\alpha,\beta$-dihydroxytricarballylic, aconitic, citric, phthalic, terephthalic, isophthalic, naphthalene dicarboxylic, succinic, maleonic, adipic, pelargonic, azelaic, sebacic, pimelic, maleic, itaconic acids, etc. Acids are preferred which have no more than 4 carboxylic acid groups and a molecular weight not exceeding 350.

Example V illustrates the procedure used in preparing a polymeric product from the heterocyclic alcohols of this invention.

EXAMPLE V

To a one-liter flask equipped with stirrer, nitrogen inlet, condenser and trap for separating water from the condensate, are added: 201.5 grams of the heterocyclic alcohol produced in Example I, 74.3 grams trimellitic acid anhydride and 39.6 grams of tetrahydrofurfuryl alcohol. The reaction mixture is heated to refluxing and water separated from the condensate. After heating for about 65 minutes, the acid number is 54.2. At that time 11 grams of phthalic anhydride is added and refluxing continued for another 30 minutes at which time the acid number is found to be 56.0. The product is cooled to 140° C. and poured with stirring into a solvent mixture consisting of 365.5 grams of distilled water, 42.5 grams of isopropyl alcohol and 31.7 grams of 26° Baumé ammonia hydroxide. The resultant resin solution has these properties: density of 8.523 lbs. per gallon; Gardner viscosity of X; a slightly hazy homogeneous appearance; and a non-volatile proportion of 38.4%. Similar results are obtained when the heterocyclic alcohol used is one made according to Example I, but using soya fatty acid.

EXAMPLE VI

The procedure of Example V is repeated a number of times using individually in place of the heterocyclic compound of that example an equivalent amount of the heterocyclic compounds prepared in Examples III and IV. In each case, a resin suitable for use in water-soluble paint is obtained.

EXAMPLE VII

The procedure of Example X is repeated using in place of the trimellitic anhydride an equivalent amount of the following polybasic acids respectively: trimesic, hemimellitic, phthalic, succinic, adipic, azelaic, pimelic, maleic and itaconic acids. In each case, a water-soluble resin is obtained suitable for use in water-soluble paints is obtained.

EXAMPLE VIII

A semi-gloss house paint is prepared using the resin obtained in Example V by mixing the following ingredients in a pebble mill for 18 hours: 380 lbs. of very finely divided $TiO_2$ (RA 50 Rutile); 67 lbs. of calcium carbonate (Atomite); 50 lbs. of zinc oxide (Kadox 515); 20 lbs. of butyl Cellosolve; 200 lbs. of water and 256.6 lbs. of a solvent mixture made by mixing 363.5 lbs. of distilled water, 42.5 lbs. of isopropyl alcohol and 31.7 lbs. of 26° Baumé ammonium hydroxide. After 18 hours of mixing on the pebble mill, the following materials are added to this product; 256.6 lbs. of the 3-component solvent mixture described above, 1.7 lbs. of 6% Co drier, 1.7 lbs. of 6% Mn drier, 4.3 lbs. of Pb drier and 33.7 lbs. of butyl Cellosolve. The mixing is continued until these material have been uniformly dispersed. The resultant paint has the following properties: 59.6% nonvolatile matter; 12.0 lbs. per gallon; a rating of 51 (2 coats on birch) for 60° gloss; and a viscosity of 70 Krebs units.

Upon application, this plant composition brushes very well, sets to touch in 20 minutes and dries completely overnight, is non-yellowing on interior surfaces, is stable to zinc oxide and has excellent adhesion to wood, glass and tin plate.

EXAMPLE IX

The procedure of Example VIII is repeated without the tetrahydrofurfuryl alcohol to determine whether this component contributes to the non-yellowing and zinc oxide stability. The same composition made without this alcohol still has the non-yellowing and zinc oxide stability of the product of Example VIII.

EXAMPLE X

The procedure of Example VIII is repeated a number of times using respectively in place of ammonium hydroxide equivalent amounts of the following bases for neutralizing the resin: dimethyl ethanolamine, hydroxyethylamine, t-butyl amine, methyl amine, diamethyl amine trimethyl amine lithium hydroxide, sodium hydroxide, potassium hydroxide and cesium hydroxide respectively. In each case similar results are obtained as in Example VIII.

EXAMPLE XI

The procedure of Example X is repeated using in place of the heterocyclic alcohols made with the drying oil and semi-drying oil type radicals of Example VIII, the corresponding heterocyclic alcohols in which the R group does not have the ethylenic saturation found in such drying and semi-drying radicals. The procedure of Example VIII is therefore repeated a number of times using in place of the heterocyclic alcohol of that example an equivalent amount of the individual heterocyclic alcohols made according to Example VIII using stearic, palmetic, benzoic, chlorobenzoic, phenylacetic, cyclohexylacetic, and trifluoromethylcyclohexylacetic acids respectively. The resultant resins are water-thinnable and yield non-yellowing vehicles which are cured on baking through the residual acidity of the polymer by the addition of a water-soluble melamine-formaldehyde resin, a water-soluble epoxy resin, a water-soluble urea-formaldehyde resin, the hexakismethoxymethyl melamine resin (Cymel 300) or a water-soluble phenol-formaldehyde resin.

The following examples illustrate other techniques of using the heterocyclic alcohols of this invention in the preparation of water-soluble resins suitable in water-thinned paints.

EXAMPLE XII

An aduct is prepared by reacting dehydrated castor oil fatty acids and 2-amino-2-methyl-1,3-propanediol to yield the corresponding heterocyclic alcohol. A resin is then prepared from this using 93.3 grams phthalic anhydride; 29.5 grams 2,2-dimethylol propionic acid; and 250.5 grams of the alcohol prepared above. This product is charged to a three-neck flask equipped as before and heated until 5.7 grams of water is eliminated. The acid number of the resin is thereby reduced to about 55. The resulting resin is neutralized with 5.9 grams of potassium hydroxide and 20.0 grams of 26° Baumé ammonium hydroxide, and a solvent composed of 6.5 parts isopropanol and 250 parts water is added. The resultant resin solution has the following properties: A solids content of 50.3%; a Gardner I viscosity and pounds per gallon of 8.47. When used in a preparation of an exterior house paint this product is compatible with zinc oxide without gellation of the paint. The paint has good adhesion over chalky surfaces, dries rapidly and is resistant to mildew.

EXAMPLE XIII

The procedure of Example XII is repeated with similar results using in place of the 2,2-dimethylol propionic acid an equivalent amount of the following individual compounds: the monoglycerides of phthalic, maleic, succinic and itaconic acids respectively, and the corresponding monoesters of trimethylol ethane and trimethyol propane respectively.

EXAMPLE XIV

The heterocyclic alcohol prepared according to Example I from dehydrated castor oil fatty acid and 2-amino-2-methyl-1,3-propanediol (molecular weight of 349) is reacted in an amount of 174.5 grams with 56 grams of itaconic anhydride in a flask heated at 80° C. for 1 hour or until all the itaconic anhydride has reacted to form the half ester. Then the following reagents are added: 200 grams of styrene, 400 grams of butyl Cellosolve and 8.6 grams of ditertiary butyl peroxide. The resultant mixture is heated with stirring at 140° C. for 6 hours. The resultant viscous resin is neutralized with ammonium hydroxide or other suitable base as indicated above and thinned with water. Upon the addition of a suitable drier, as indicated above, and application as a coating, clear, air-drying films are obtained which are water-resistant. These are used to prepare semi-gloss enamels with outstanding adhesion to wood, steel and aluminum.

EXAMPLE XV

The procedure of Example XIV is repeated with similar results when equivalent amounts of acrylic anhydride and methacrylic anhydride respectively are substituted for the itaconic anhydride. Likewise, similar results are obtained when the heterocyclic alcohol of that example is replaced by other heterocyclic alcohols prepared from other drying oil acids, namely: soya, linseed, oiticica and Chinawood oil acids.

Surface coatings made from the resins of this invention have excellent reverse impact resistance exceeding 28 inch lb., resistance to salt spray, resistance to water, acids and alkaline, good freeze-thaw stability, and also have excellent gloss retention. They also have good recoatability and detergent resistance which makes them suitable for application and appliance finishing. The compositions also have inherent mildew resistance and do not cause corrosion of the containers, which property is notably lacking in resin latex paints.

It is believed that many of the advantageous properties of the heterocyclic compound and resins of this invention is due to the fact that the R group, originally attached to the acid radical is now bound to a heterocyclic nucleus and not through an ester linkage as is usually the case in corresponding conventional resins used in coatings, etc.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. The polymerization product obtained by the condensation reaction of a polycarboxylic acid having no more than four carboxylic groups and a molecular weight not exceeding 350 with a heterocyclic compound having the formula

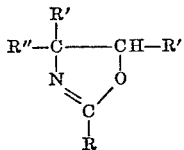

wherein
R′ is a radical selected from the class consisting of hydrogen and R″;
R″ is a radical selected from the class consisting of aliphatic, cycloaliphatic and aromatic hydrocarbon radicals and derivatives of said hydrocarbon radicals having only hydroxy groups as the derivative groups, the combination of said R″ and R′ radicals having at least two hydroxy groups attached to aliphatic carbon atoms therein and having no more than four said hydroxy groups, said hydrocarbon radicals and derivatives thereof having no more than 10 carbon atoms therein; and
R is a radical selected from the class consisting of aliphatic, cycloaliphatic and aromatic hydrocarbon radicals and derivatives thereof in which each derivative group is selected from the class consisting of hydroxy, acyloxy, chloro, fluoro, cyano, —OR″, carboxyl and carboxylate groups, said hydrocarbon and said hydrocarbon derivative radicals each having no more than 24 carbon atoms therein.

2. The polymerization product of claim 1, in which said acid is trimellitic acid.

3. The polymerization product of claim 1 in which said acid is trimestic acid.

4. The polymerization product of claim 1 in which said acid is phthalic acid.

5. The polymerization product of claim 1 in which said heterocyclic compound is 2-heptadecadienyl-4,4-bis(hydroxymethyl)-oxazoline.

6. The polymerization product of claim 1 in which said heterocyclic compound is 2-heptadecatrienyl-4,4-bis(hydroxymethyl)-oxazoline.

7. The polymerization product of claim 1 in which said heterocyclic compound is 2-heptadecenyl-4,4-bis(hydroxymethyl)-oxazoline.

8. The polymerization product of claim 5 in which said acid is trimellitic acid.

9. The polymerization product of claim 6 in which said acid is trimellitic acid.

References Cited

UNITED STATES PATENTS

| | | | |
|---|---|---|---|
| 2,309,243 | 1/1943 | De Groote et al. | 252—344 |
| 2,443,825 | 6/1948 | Johnson | 195—36 |
| 2,905,644 | 9/1959 | Butter | 252—392 |
| 2,965,459 | 12/1960 | De Gray et al. | 44—63 |
| 3,235,507 | 2/1966 | Pollack et al. | 252—301.2 |

WILLIAM H. SHORT, *Primary Examiner.*

M. GOLDSTEIN, *Assistant Examiner.*

U.S. Cl. X.R.

260—22, 29.2, 29.4, 307, 868